United States Patent [19]
Flattery et al.

[11] Patent Number: 5,607,726
[45] Date of Patent: Mar. 4, 1997

[54] PROCESS FOR THE PREPARATION OF COMPOSITE COATINGS WITH VARIABLE THICKNESS

[75] Inventors: David K. Flattery, Athens, Pa.; Thomas R. Phillips, Vienna, W. Va.; George Z. Wu, Sayre, Pa.

[73] Assignee: E. I. du Pont de Nemours and Company, Wilmington, Del.

[21] Appl. No.: 323,990

[22] Filed: Oct. 17, 1994

[51] Int. Cl.⁶ .................... B05D 1/36; B05D 5/00
[52] U.S. Cl. .................... 427/261; 427/358; 427/294; 118/411
[58] Field of Search .................... 427/261, 358, 427/294; 118/410, 411; 425/466, 467

[56] References Cited

U.S. PATENT DOCUMENTS

| | | | |
|---|---|---|---|
| 2,901,770 | 9/1959 | Beck | 18/13 |
| 3,206,323 | 9/1965 | Miller et al. | 117/34 |
| 3,347,962 | 10/1967 | Dieck et al. | 264/90 |
| 3,354,025 | 11/1967 | Aykanian et al. | 161/199 |
| 3,405,425 | 10/1968 | Buckley et al. | 18/13 |
| 3,443,278 | 5/1969 | Nauta | 13/18 |
| 3,471,898 | 10/1969 | Krystof | 18/13 |
| 3,520,964 | 7/1970 | Metz | 264/90 |
| 3,540,964 | 11/1970 | Nauta | 156/244 |
| 3,640,752 | 2/1972 | Ishiwata et al. | 117/47 |
| 3,663,292 | 5/1972 | Herzhoff et al. | 117/34 |
| 3,676,178 | 7/1972 | Browatiki et al. | 117/34 |
| 3,735,729 | 5/1973 | Bird | 118/50 |
| 3,738,790 | 6/1973 | Violette et al. | 425/467 |
| 3,749,053 | 7/1973 | Timson | 118/50 |
| 3,799,718 | 3/1974 | Kiyono | 425/131 |
| 3,916,043 | 10/1975 | Fowble | 427/294 |
| 4,045,598 | 8/1977 | Henson | 427/296 |
| 4,154,879 | 5/1979 | Choinski | 427/402 |
| 4,177,315 | 12/1979 | Ubersax | 428/336 |
| 4,265,941 | 5/1981 | Saito | 427/296 |
| 4,283,443 | 8/1981 | Choinski | 427/295 |
| 4,302,263 | 11/1981 | Postupack | 156/100 |
| 4,316,868 | 2/1982 | Esposito et al. | 264/171 |
| 4,335,672 | 6/1982 | Krussig | 118/50 |
| 4,411,614 | 10/1983 | Feathers | 425/467 |
| 4,443,504 | 4/1984 | Burket et al. | 427/445 |
| 4,469,743 | 9/1984 | Hiss | 428/215 |
| 4,476,075 | 10/1984 | Brinkmann et al. | 264/40.7 |
| 4,489,154 | 12/1984 | Taylor, Jr. | 430/253 |
| 4,508,764 | 4/1985 | Zeldes | 427/296 |
| 4,545,321 | 10/1985 | Bassa | 118/50 |
| 4,562,023 | 12/1985 | Pabst et al. | 264/75 |
| 4,768,939 | 9/1988 | Bourcier et al. | 425/66 |
| 4,808,357 | 2/1989 | Bourcier et al. | 264/151 |
| 5,024,895 | 6/1991 | Kavanagh et al. | 428/437 |
| 5,087,502 | 2/1992 | Esposito et al. | 428/156 |
| 5,130,174 | 7/1992 | Esposito | 428/156 |

FOREIGN PATENT DOCUMENTS

WO93/05946  4/1993  WIPO.

*Primary Examiner*—Katherine A. Bareford
*Attorney, Agent, or Firm*—Rodney B. Carroll

[57] ABSTRACT

Composite coatings are provided having a variable thickness and a coloration gradient in the cross-web direction using shims to direct flow in a premetered extrusion extrusion process and an edge band is used to provide stability to the bead. Further stability is provided by a vacuum gradient matched to the specific shim design used. The composite coatings are useful in preparing laminated structures such as automobile windshields with a gradient band.

8 Claims, 3 Drawing Sheets

PROCESS FOR THE PREPARATION OF COMPOSITE COATINGS WITH VARIABLE THICKNESS

FIELD OF THE INVENTION

The present invention relates to an improved process for the preparation of composite coatings with variable thickness as measured in a cross-web direction. More particularly, a process in which pre-metered coatings are applied to a carrier film such that at least one layer has variable thickness as measured in the cross-web direction and at least one layer has uniform thickness as measured in the cross-web direction.

BACKGROUND OF THE INVENTION

It is known to provide a color image having a gradation in the cross-web direction by coating techniques such as gravure printing. Products having such a variation find utility in packaging applications as well as in safety glass for automobiles and in architectural applications.

In some applications, a gradated colored stripe is formed by coextruding a molten colored layer along with a clear thermoplastic sheet. In this process, the colored stripe is embedded in and forms an integral part of the thermoplastic sheet. U.S. Pat. No. 4,316,868 describes one such process.

These processes have inherent limitations. For example, in applications such as gravure printing, the overall quality of the gradated image is dependent on the quality of the engraved gravure cylinder. Further, applications which utilize pigment-based coating solutions place additional limitations on gravure printing due to accumulation of pigment particles under the doctor blade which is used in gravure printing. These particles cause streaks in the coated product which make it unacceptable for applications requiring high optical quality.

While the coextrusion process overcomes the quality limitations inherent in gravure printing, flexibility with respect to colors and widths of the gradations is limited. Further, color and width changes require extensive cleaning of the die and modifications to the die assembly which are costly in terms of down-time and labor requirements involved in the operation.

Slot die extrusion coating of uniform coating thickness in the cross-web direction has been described in U.S. Pat. No. 4,411,614 wherein inserts in flow distribution channels are used to improve the flow uniformity of coating solutions in the cross web direction. The inability of this method, however, to produce an optical density gradient in the cross-web direction precludes this process from being used in producing colored windscreens.

Slot die coatings of variable thickness has been described in Patent Application PCT/US91/06899. This process, however, requires a symmetrical/mirror image design which minimizes its utility for colored windscreen applications.

In the laminated safety glass industry, especially laminates for automotive windscreens, the use of automated unwinding, stretching and blanking equipment is widespread. For this equipment to work properly, o especially with gradient band interlayers for automotive windscreens, the interlayer roll and the orientation of the gradient band on that roll should be constant. That is, for example, the roll should always unwind clockwise or counterclockwise and the colored band should always be oriented up or down on the roll.

With a symmetrical/mirror image coating design as described in Patent Application PCT/US91/06899, only one slit band of a set will yield on transfer an interlayer roll with the desired orientation. The other slit band will yield a roll of unacceptable, opposite orientation.

It has been shown that if the unacceptable slit roll of coated carrier is first rewound backwards, it too will yield the proper orientation on transfer. However, the re-winding operation is costly and reduces quality by subjecting the coated carrier to possible physical damage as well as the introduction of contaminants which would make it unacceptable for high optical requirements like automotive windscreens.

Further, the necessity to make a set of two bands restricts flexibility to meet marketplace requirements since many different bandwidths exist. If maximum width is produced, substantial waste is created when smaller bands are called for.

The limitations associated with the coating processes heretofore used can be overcome by coating an asymmetric, non-mirror image design, i.e., a band or bands that vary in thickness and width, if desired, in the cross-web direction as measured from right-to-left or left-to-right. Upon slitting, all bands will immediately have the same, desired orientation and width.

The use of an asymmetric shim design for coating the composite layers provides improved process utility in that all the bands will immediately have the same winding orientation when slit, thereby, eliminating damage and contamination concerns.

A further advantage of the asymmetric shim design is evident in that one can produce any number of desired bands or bandwidths within a given design subject only to the physical dimensions of the die body.

Because of the difference in coating thickness at the edges of an asymmetric shim design, coating stability can be adversely affected. It has been found that the addition of a dummy band, that is, a narrow band of equivalent maximum coating thickness to the opposite edge, stabilizes the coating process. This narrow band is discarded after slitting. The width of the band is chosen to maximize stability but minimize slit waste.

U.S. Pat. No. 5,500,274, filed Mar. 22, 1994, discloses a gradated color strip process by coating the stripe on a carrier film with subsequent transfer to the thermoplastic sheet. This process creates unstable process control of the variable thickness coating bead due to processing conditions such as web speed, solution viscosity, and coating thickness.

The use of a vacuum below the coating bead to counter the drag of the moving web and stabilize the coating bead is known. In general, the vacuum applied through a slot is uniform across the web. U.S. Pat. No. 4,265,941 discloses the use of a segmented slot to control the formation of thick regions of the coating at the edges of the carrier film which are typically called edge beads.

Herein, however, it is shown that varying the applied vacuum in the cross-web direction by variably plugging the vacuum slot, dependent on a given shim design, enhances the coating process by optimizing the vacuum level across the web and, thereby, providing coatability over a greater vacuum range, herein defined as vacuum latitude.

SUMMARY OF THE INVENTION

Coloration of the layer of variable thickness provides a gradient in the optical density of the composite which makes it suitable for use in laminated automotive windscreens when transferred to an interlayer used in these applications.

The use of a dummy band of uniform thickness at one edge of the variable thickness layer provides dimensional stability so that the variable thickness layer can be coated in an asymmetric fashion. i.e., the optical density gradient when measured from any edge can be from low to high or high to low. Further, any number of optical density gradients as measured in the cross-web direction can be produced subject only to the physical limitations of the particular equipment being used.

The dimensional stability of the coating process is further stabilized by creating a variable vacuum profile so that the thinner areas of the variable thickness layer are subjected to less vacuum than the thicker areas. The variable vacuum profile is created by selectively plugging regions of the vacuum slot used in slot die extrusion coating in a pattern dependent upon the shim design used.

DETAILED DESCRIPTION OF THE INVENTION

Figure 1:
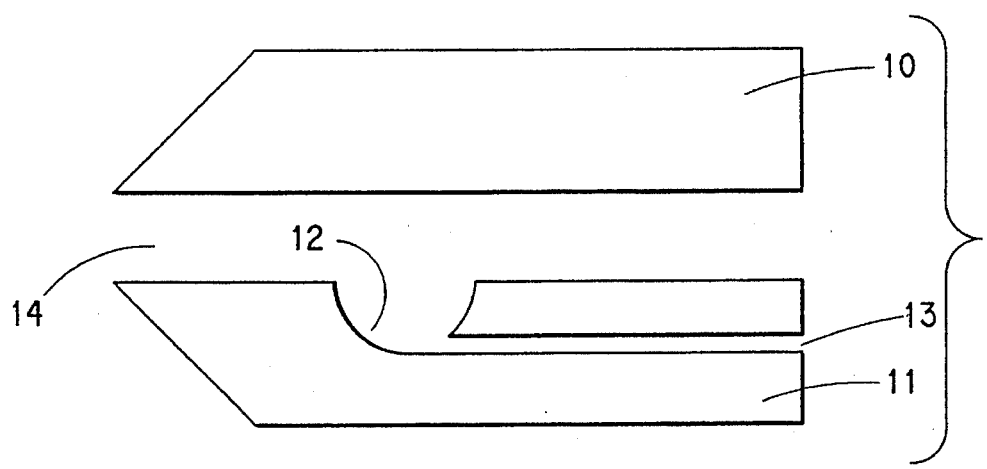
FIG. 1 is a side elevation view of an extrusion coating die.

Referring now to FIG. 1, the coating apparatus shown is used in carrying out a premetered coating process. This type of coating process is distinguished from other processes in that the rate of deposition of coating fluid is controlled by the rate at which the fluid is delivered to the die. The extrusion die is formed from a top piece 10 and a bottom piece 11 fabricated from dimensionally stable and chemically inert material. Stainless steel is typically used, but other suitable materials may be used. A distribution channel is carved in the top piece, the bottom piece, or in both pieces to distribute the coating fluid across the width of the die. FIG. 1 shows a distribution channel 12 carved in bottom piece 11. The coating fluid is formed into a sheet and directed to the web through an extrusion slot 14. Slot 14 is formed either by spacers or shims between the die pieces or by an opening carved into the pieces. In usual practice the combination of the distribution channel geometry and the slot geometry cause the coating fluid to deposit onto a web or carrier film as a sheet having a uniform thickness.

Figure 2:
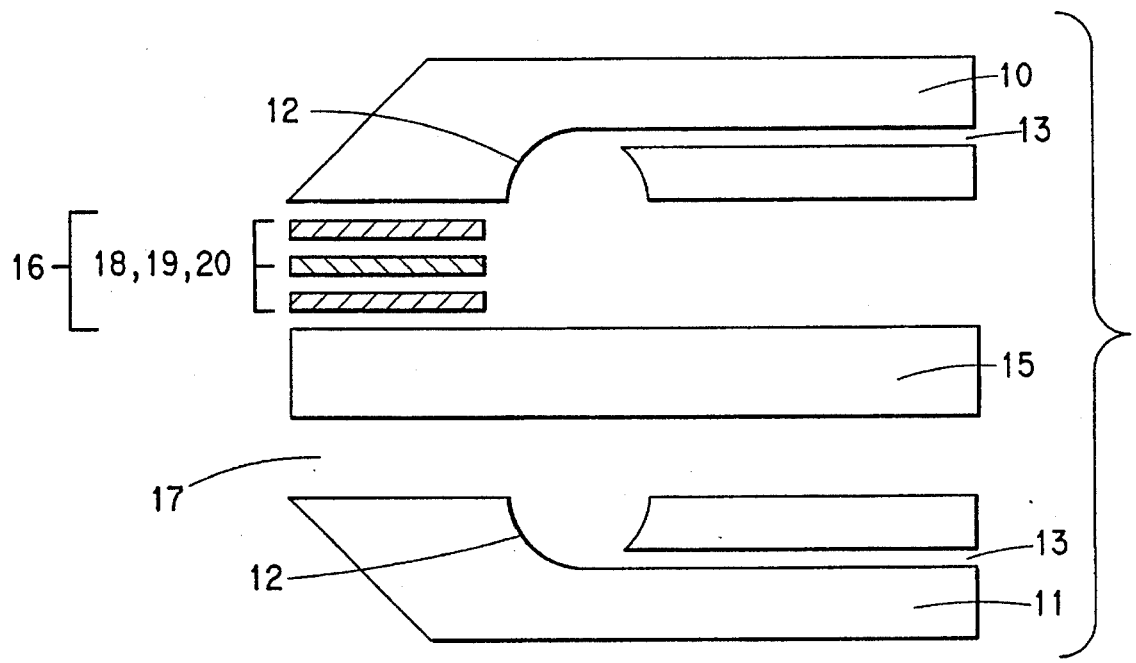
FIG. 2 is a side elevation of a dual-slot extrusion coating die.

FIG. 2 shows the internal structure of a preferred apparatus of this invention. The extrusion die is formed by top piece 10, bottom piece 11 and center piece 15 which separates the two coating layers. Distribution channel 12 is carved in top piece 10 and bottom piece 11. Coating fluid is fed to the two distribution channels 12 by means of feed inlets 13. In some cases, the two distribution channels 12 along with the feed inlets 13 may be carved on either side of center piece 15. Extrusion slot 16 in the top layer is formed by a stack of shims such as 18, 19, 20 illustrated in FIGS. 2 and 3. As described below, the said shims in the top layer are shaped to deposit a coating having a variable thickness in the cross-web direction. Extrusion slot 17 is formed by shims between center piece 15 and bottom piece 11.

The asymmetric shim designs of the current invention can be used to produce composite coating with cross-web thickness gradients. These shims may be fabricated from metal or a suitable polymeric material which can be molded and will remain dimensionally stable under operating conditions for the die. Parts of these shims fill previously open regions of the slot and alter the internal geometry of the slot. Since the pressure drop of a Newtonian fluid flowing through a thin slot is proportional to the length and inversely proportional to the cube of the slot height, a gradient in the flow rate of coating fluid is achieved.

Figure 3:
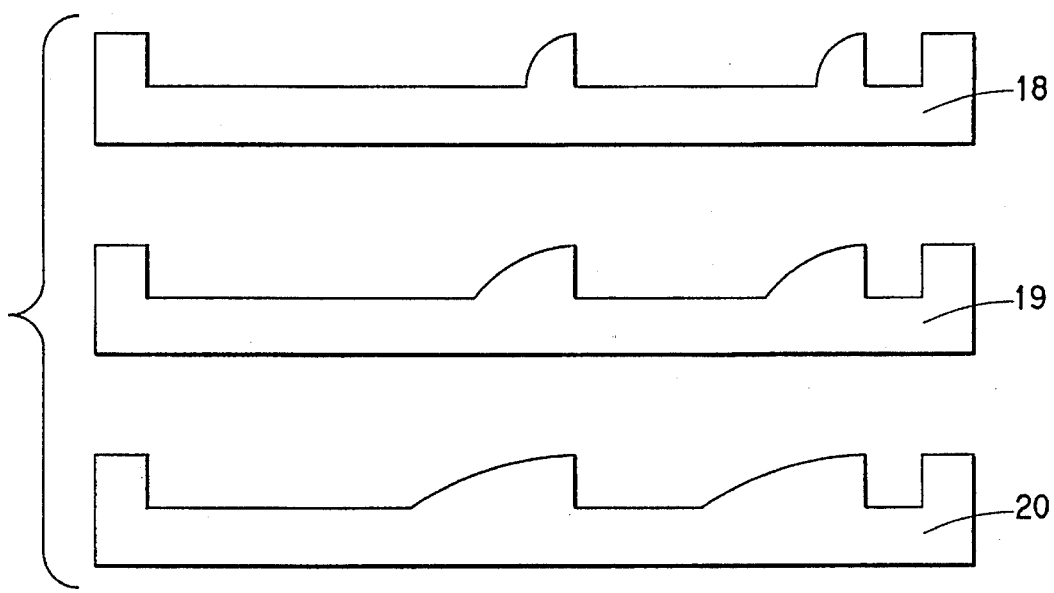
FIG. 3 is a top view of shims which can be stacked and inserted into a slot die for extrusion coating to provide a series of bands of variable thickness in the cross-web as measured right-to-left or left-to-right including a dummy band for coating bead stability.

The top view as shown in FIG. 3 schematically illustrates the individual shims 18, 19 and 20 which when stacked and placed in a slot die will yield two asymmetric bands of variable thickness and a dummy band of uniform thickness at the one edge for coating stability.

Figure 4:
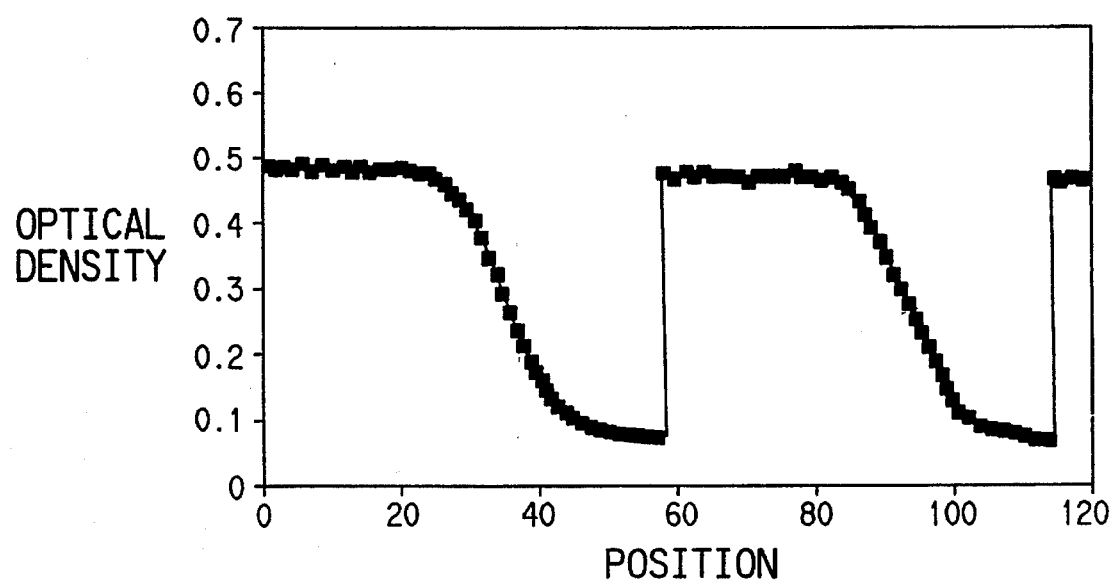
FIG. 4 is an optical density profile obtained using the stack of shims shown in FIG. 3.

Coating thickness variation in the cross-web direction is found to result in a corresponding optical density variation when the coating contains colorants. FIG. 4 shows a typical optical density profile for the shim set described in FIG. 3 for a colored or pigmented coating layer.

It has been found that the addition of a dummy band, that is, a narrow band of equivalent maximum coating thickness to the opposite edge, stabilizes the coating process. This narrow band is discarded after slitting. The width of the band is chosen to maximize stability but minimize slit waste.

Figure 5:
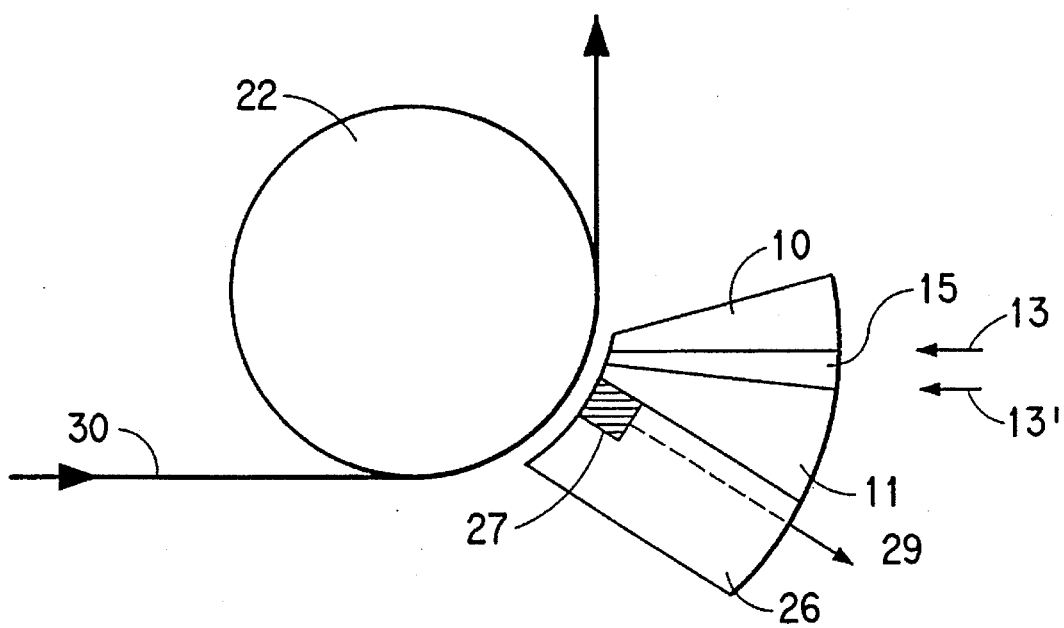
FIG. 5 is a side view schematic of a dual slot die extrusion coating system with a vacuum box.

Further, it has been shown that the placement of a shim set as described in FIG. 3 in a dual slot extrusion coating die configuration as stylized in the side view shown in FIG. 5 is not critical. That is, the shim set may be placed between the top die section 23 and the separating wedge 24 or between the bottom die section 25 and the separating wedge 24. The former will result in a composite coating where the uniform coating layer is against the carrier film and the variable thickness layer is superimposed on top while the latter configuration will result in the variable thickness coating layer being against the carrier film while the uniform thickness layer is superimposed.

In FIG. 5, the coating solutions are pumped under pressure through delivery channels 13 and 13' to the moving carrier film web 30 supported on the coating drum 22. The solution moving through each delivery channel, i.e., colored or non-colored, is based on the desired composite construction and shim set placement. Additional coating layers can be formed using a die with additional extrusion slots.

It has further been shown that the supporting nature of the uniform thickness layer is effective in either configuration during transfer from the carrier film to an adhesive interlayer film such as polyvinyl butyral.

The process is further improved by using a vacuum to stabilize the coating bead. Vacuum box 26 with vacuum slot 27 and exhaust port 29 is connected to a vacuum pump (not shown) in FIG. 5. The process of the current invention utilizes a vacuum gradient designed to match the specific shim design. That is, the vacuum is adjusted so that the thinner coating thickness areas are subjected to less vacuum than the thicker coating thickness areas.

Since it has not been possible to actually measure the vacuum profile in the cross-web direction, the effect has been determined as vacuum latitude. Vacuum latitude is defined as the vacuum range over which the coating can be processed without either creating vacuum streaks in the coating, typically in the thin coating thickness areas, due to high vacuum or non-coatability, that is, coating bead instability, typically starting in the area of thicker coating, due to low vacuum.

The method of achieving a vacuum gradient is not critical. One preferred method has been found to be plugging portions of the vacuum slot 27 of vacuum box 26 in FIG. 6 in the cross-web direction with a caulk material that is inert to the coating solutions.

Other possible means to be considered would be removable or permanent inserts or plugs, a permanently milled vacuum slot or by designing a vacuum manifold whereby valves along the manifold can be activated or de-activated to fit any coating design.

Of course, the actual plugging profile is dependent on the physical dimensions of the die, the number and width of the individual profile bands, the speed of web 30 and the flow of coating solutions 13 and 13'.

In carrying out the process of this invention, a pigmented coating composition is prepared by dispersing colorant or pigments in a binder resin. A non-pigmented resin solution is prepared by dissolving the binder resin in a suitable solvent or solvent blend. The resin selected may be the same or different from that used in preparing the pigmented dispersion. Coating is accomplished at speeds from 9.14 meters per minute (30 feet per minute) to 152.4 meters per minute (500 feet per minute). The coatings are immediately dried after being deposited on the carrier film.

Pigments used for coloration are preferably crystalline solids with extremely fine particle size having specific surface areas between 25 and 600 square meters/gram as measured by the BET (Brunauer-Emmett-Teller) method. In selecting the pigments, color stability is an important factor particularly in outdoor applications such as automobile windshields. Light fast pigments such as copper phthalocyanine blue, copper phthalocyanine green, carbazole violet, anthraquinone red, quinacridone red, cadmium sulfoselenide red, monoazo red, azo condensation yellow, monoarylide yellow, diarylide yellow as well as carbon is black or combinations of pigments may be used. In some applications it may be advantageous to use a combination of pigments and dyes for achieving a balance of color stability and reduced haze.

In preparing the inks for use in this invention, suitable binder resins include nitrocellulose, cellulose esters such as cellulose acetate butyrate, cellulose acetate propionate and cellulose acetate, and polyvinyl acetals such as polyvinyl butyral. Preferred binder resins are polyvinyl butyrals having a hydroxyl content, calculated as polyvinyl alcohol, from about 10 to 35% by weight. The polyvinyl acetate content of these resins is from about 0 to 5% and the polyvinyl butyral content is from about 60 to 90% by weight. The weight average molecular weight of these resins as determined by size exclusion chromatography is from about 10,000 to 250,000. The content of the polyvinyl alcohol, polyvinyl acetate and the polyvinyl butyral along with the weight average molecular weight strongly influences various properties of the ink such as surface tension, solvent/solvent blend selection, transfer conditions, adhesion and shatter resistance of the film transfer coating when used in safety glass applications. Preferred binder resin loadings in the inks, expressed as weight percent of the binder resin in the coating ink solution is about 0.1 to 40%.

The solvent or solvent blend should be chemically inert to the materials used in the carrier film. Preferred solvents in amounts from about 28 to 99% by weight of the ink which can be used are alcohols such as methanol, ethanol, n-propanol, iso-propanol, n-butanol, iso-butanol, diacetone alcohol and benzyl alcohol, glycol ethers such as 1-methoxy-2-propanol, butyl glycol and methoxy butanol, esters such as glycolic acid-n-butyl ester, ketones such as cyclohexanone, and N-methyl-2-pyrrolidone. In addition non-solvents and solvents possessing limited solubility such as methyl ethyl ketone, methyl iso-butyl ketone, methyl acetate, ethyl acetate, n-butyl acetate, aliphatic and aromatic hydrocarbons such as cyclohexane and toluene, may be used in conjunction with solvents.

Dispersants are useful in preparing the pigment based inks used in this invention. The choice of dispersant will depend on the pigment, binder resin and the solvent used in the inks. Additives may be used in the inks and the binder resin coatings to enhance the flexibility of the coatings such as plasticizers. In addition, non-ionic surfactants may be used to reduce surface tension of the ink and to aid in wetting and leveling of the coating on the carrier film.

The carrier film may be selected from such materials as polypropylene, polyester, polyamide and polyvinyl fluoride films. The thickness of the film is generally about 0.00127 to 0.0762 centimeters (0.0005–0.03 inch). The carrier film may be treated to a desired surface tension level through flame treatment or corona treatment which is well known to those skilled in the art.

The products of this invention are particularly useful for thermal transfer to thermoplastic sheeting having a roughened surface, such as plasticized polyvinyl butyral used in safety glass laminates. The composite structure transfers readily to the roughened surface at moderate temperatures by passing the polyvinyl butyral sheeting and the composite in contact with each other through nip rolls heated to −1° to 150° C. (30° to 300° F.). By providing a non-pigmented coating of uniform thickness as an integral part of the composite coating structure against the carrier film or superimposed upon the pigmented coating, the pigmented coating which varies from a maximum thickness to essentially zero is supported during the transfer, and the quality of the optical gradient is not disturbed in the transfer process.

The products of this invention may be used directly in preparing laminates. For example, a glass/plastic laminate may be prepared by adhering the composite to a glass sheet using a suitable known adhesive materials such as polyvinyl butyral or polyurethane film. The carrier film may or may not be coated with a known antiabrasion coating of the type disclosed in U.S. Pat. Nos. 4,177,315 and 4,469,743.

The invention is further illustrated by the following examples in which parts and percentages are by weight unless otherwise indicated.

EXAMPLE 1

A three by eight inch (20.320 cm) band asymmetric shim set with an 0.8 inch (2.032 cm) dummy band was inserted into a dual slot extrusion coating die as illustrated in FIG. 5 such that the shim set is between the top die section 10 and the separating wedge 15.

The shim set provided 26.3 inches (66.802 cm) of overall ink coating width. The bottom shim 20 as depicted in FIG. 3 was 0.004 inches (0.0102 cm) thick, the middle shim 19 was 0.003 inches (0.0076 cm) thick and the top shim 18 was 0.002 inches (0.0051 cm) thick for an overall 0.009 inch gap (0.0229 cm) in the widest area.

A 27 inch (68.580 cm) wide uniform thickness, gap 0.010 inches (0.0254 cm), shim, was set between the bottom die section 11 and the separating wedge 15 for clear solution.

The vacuum box illustrated in FIG. 5 was set up so that an inert caulk 28 filled the entire slot 27 with the exception of 0.5 inches (1.270 cm) on the aisle side and 1.4 inches (3.556 cm) on the drive side.

A non-colored resin solution of viscosity 900 centipoise is applied through the bottom die section 11 of the die assembly. A pigmented resin solution of viscosity 850 centipoise is applied through the top die section 10 of the die assembly.

The two solutions are simultaneously applied to a polypropylene carrier film, thereby, resulting in a dried composite coating with a non-colored, uniform thickness layer against the carrier and the variable thickness colored layer superimposed thereupon.

The coating line speed was 150 feet per minute.

Stable coating was initially achieved at a vacuum setting of 4.0 inches of water. The vacuum was increase to a level of 8.2 inches of water where unacceptable vacuum lines were noted in the coating. The vacuum was then reduced to again achieve stable coating and then reduced further to a level of 2.6 inches of water where the coating bead stability was lost.

The difference between the upper and lower stable operating range is defined as the vacuum latitude.

The vacuum latitude is 5.6 inches of water.

Comparative Example A

The coating set-up described in Example 1 was repeated except that all the caulk was removed from vacuum slot 27.

Stable coating was established at a vacuum setting of 1.0 inches of water at a line speed of 150 feet per minute. The vacuum was increased to a level of 1.2 inches of water where unacceptable vacuum lines occurred. The vacuum was reduced to re-establish stable coating and then reduced to 0.6 inches of water where coating bead stability was lost.

The vacuum latitude is 0.6 inches of water.

Comparative Example B

A two by 11.8 inch (29.972 cm) band asymmetric shim set without a dummy band was inserted into a dual slot extrusion die as illustrated in FIG. 5 such that the shim set was between the top die section 10 and the separating wedge 15. Overall ink coating width was 25.5 inches (64.770 cm).

A 26.5 inch (67.310 cm) wide uniform thickness shim, gap 0.010 inches (0.0254 cm), was set between the bottom die section 11 and the separating wedge 15 for clear solution.

The solution viscosities for the clear and pigmented solutions were 1350 centipoise and 1400 centipoise respectively.

Figure 6:
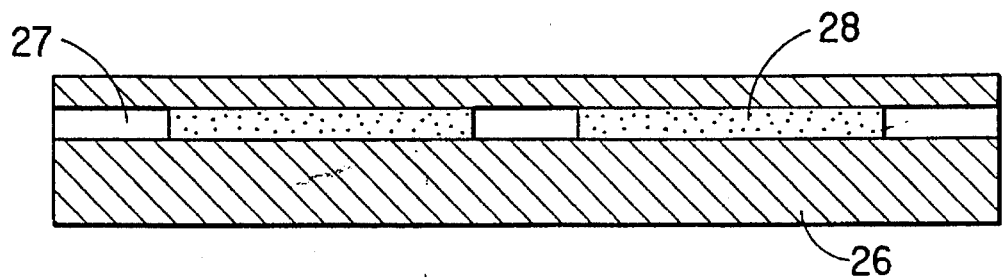
FIG. 6 is a front view of a typical slot vacuum box plugged with caulk for generating a variable vacuum profile.

The vacuum box slot 27 of FIG. 6 was filled with inert caulk 28 so that 0.5 inches (1.270 cm) of the aisle side were unfilled and 0.8 inches (2.032 cm) of the drive side were unfilled.

The line was operated at 150 feet per minute.

There were no conditions where acceptable coating could be maintained.

Comparative Example C

The set-up of Comparative Example B was changed so that the vacuum slot 27 of FIG. 6 was completely open.

There were no conditions where acceptable coating could be maintained.

EXAMPLE 2

A 12.5 inch (31.750 cm) each dual band symmetric shim set was placed between the top die section 10 and the separating wedge 15 of a dual slot extrusion coating die. The overall ink coating width was 25.5 inches (64.770 cm) with the bottom shim 0.004 inches (0.0102 cm) thick, the middle shim 0.003 inches (0.0076 cm) thick and the top shim 0.002 inches (0.0051 cm) thick for an overall thickness of 0.009 inches (0.0229 cm) in the widest area.

A 26.5 inch (67.310 cm) wide uniform thickness shim, gap 0.010 inches (0.0254 cm), was set between the bottom die section 11 and the separating wedge 15 for the clear solution.

The vacuum box illustrated in FIG. 6 was set up so that an inert caulk 28 filled the entire slot 27 with the exception of 0.5 inches (1.270 cm) on the aisle side and 0.8 inches (2.032 cm) on the drive side.

A non-colored resin solution of viscosity 1350 centipoise was applied through the bottom die section 25 of the die assembly. A pigmented resin solution of viscosity 1400 centipoise was applied through the top die section 23 of the die assembly.

The two solutions were simultaneously applied to a polypropylene carrier film, thereby, resulting in a dried composite coating with the non-colored, uniform thickness layer against the carrier and the variable thickness colored layer superimposed thereupon.

The coating line speed was 150 feet per minute.

Stable coating was initially achieved at a vacuum setting of 4 inches of water. The vacuum was then increased to a level of 6.5 inches of water where unacceptable vacuum lines were noted in the coating. The vacuum level was reduced to re-stabilize the coating and then further lowered to 1.0 inches of water where the coating bead stability disappeared.

The vacuum latitude is 5.5 inches of water.

Comparative Example D

The coating set-up described in Example 2 was repeated except that all the inert caulk 28 was removed from vacuum slot 27.

Stable coating was established at a vacuum setting of 1.0 inches of water at a line speed of 150 feet per minute. The vacuum level was increased to a level of 1.5 inches of water where unacceptable vacuum lines appeared. The vacuum was reduced to re-establish stable coating and then further reduced to a level of 0.6 inches of water where coating bead stability was lost.

The vacuum latitude is 0.9 inches of water.

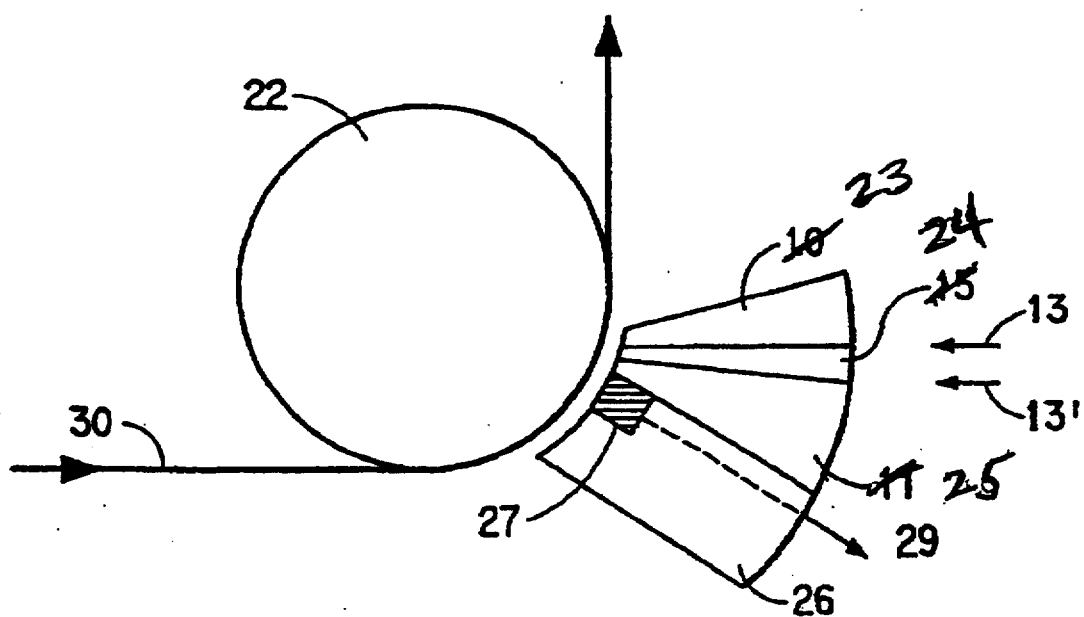

What is claimed is:

1. A process for preparing a composite coating having variable thickness and a gradient coloration in a cross-web direction comprising depositing onto a carrier film, (a) a layer of non-pigmented polymeric binder resin solution having uniform thickness and a layer of a colored polymeric binder resin solution of variable thickness, said colored layer having an asymmetric thickness gradient and a gradient coloration in the cross-web direction when measured from the center the carrier film and a dummy band of uniform thickness positioned at an edge of the carrier film; and (b) drying the layers to provide a dry composite coating.

2. The process according to claim 1 wherein said dummy band is of equal thickness to the non-pigmented layer and the colored layer on the opposite edge.

3. The process according to claim 1 wherein a vacuum box and slot, said slot having segmented openings, stabilizes the asymmetric thickness gradient by securing with a vacuum a coating bead formed when the layers are deposited on the carrier film.

4. The process according to claim 3 wherein at least one of said segmented opening of said slot is blocked to create a variable vacuum profile.

5. The process of claim 1 wherein the said polymeric resin is polyvinyl butyral.

6. The process of claim 1 wherein the layers are deposited simultaneously.

7. The process of claim 1 wherein said solutions are premetered through a dual slot extrusion die having a first and second slot openings, said die being configured such that said first slot opening provides a flow rate gradient in the cross-web direction for said colored binder resin solution.

8. The process of claim 7 wherein said flow rate gradient is provided by a plurality of internal shims positioned in said first slot opening, said shims being configured to provide a flow rate gradient in the cross-web direction.

* * * * *

UNITED STATES PATENT AND TRADEMARK OFFICE
CERTIFICATE OF CORRECTION

PATENT NO. : 5,607,726
DATED : March 4, 1997
INVENTOR(S) : David K. Flattery et al.

It is certified that error appears in the above-identified patent and that said Letters Patent is hereby corrected as shown below:

<u>Drawings,</u>
FIG. 5 is MISLABELED.
Ref. No. "11" should be -- 25 --.
Ref. No. "15" should be -- 24 --.
Ref. No. "10" should be -- 23 --.

Signed and Sealed this

Fifth Day of February, 2002

Attest:

JAMES E. ROGAN
Attesting Officer     Director of the United States Patent and Trademark Office